United States Patent Office 3,676,148
Patented July 11, 1972

3,676,148
EDIBLE COMESTIBLES AND PROCESS FOR
MAKING SAME
Duane G. De Weese, Takoma Park, Md., and Ronald
C. Hanck, Parma Heights, Ohio, assignors to SCM
Corporation, Cleveland, Ohio
No Drawing. Filed May 13, 1970, Ser. No. 37,065
Int. Cl. A23l 1/00; A22c 18/00
U.S. Cl. 99—1
7 Claims

ABSTRACT OF THE DISCLOSURE

Set forth is an edible comestible adapted for rigid-form syneresis resisting refrigerated storage. The comestible comprises a continuous phase having a gelatin content of ½–4%, the gelatin having a bloom between about 100–300, and from about ½% to 3½% of a crumb carbohydrate thickener. The comestible preferably contains meat to form a meat sauce or it can contain no meat, but can be used for enrobing pieces of meat providing a gravy therefor. On heating to a temperature of 80° F. or higher, the continuous phase collapses to a fluent palatable liquid of sauce-like consistency.

---

In the automatic vending of sandwiches there has been a desire to carry, because of their popularity, a line of hot sauce-containing sandwiches, e.g., barbecue beef, sloppy joe, meatball, etc., supplementing the cold sandwiches that are now carried.

It has been proposed to make sandwich fillers for such trade by dosing the conventional or "home-made" type sauces with a high proportion of conventional thickening agents such as flour, starch, vegetable gums, cellulosic derivatives, etc., and blending it with the meat. Such filler then is assembled into contact with the bread or roll and refrigerated to a vending temperature such as 42° F. The vendee heats the sandwich in a microwave oven to consumption temperature of about 80–130° F.

Several undesirable features exist with such sandwich fillers; they are somewhat paste-like and, when heated, do not become as fluid as does the sauce in the popular "home-made" counterpart. Such filler often has exhibited poor "mouthing" or mouth feel resulting from its paste-like characteristic. This undesirable paste-like property is necessary to prevent the filler from weeping unduly into the breadstuff, causing discoloration and imparting sogginess thereto. Like sandwich fillers, correspondingly proposed pie toppings such as those used in making pizza have had the deficiencies of soaking or discoloring the farinaceous substrate when the product was frozen and allowed to thaw, or lacked the fluidity of conventional pizza sauces when heated to consumption temperature.

Advantages of the inventive comestible includes a self-sustaining form at a temperature of from 40–60° F. for convenient construction of food assemblies coupled with resistance to syneresis when exposed to refrigerated storage, and extended shelf-life when the sandwich filler is formed into desired portions, frozen, thawed, and subsequently dispensed from the vending machine.

A further advantage is that the continuous aqueous phase will collapse on heating to a temperature in excess of about 80° F. to form a sauce possessing the fluidity of the "homemade" or conventional and popular counterpart. The above combination allows good flexibility in the making of products because the filler can be made in large quantities, formed into desirable portions and frozen for storage. Vending is made easier because the frozen portions may be removed as needed.

The instant comestible comprises an aqueous continuous phase, said continuous phase being gelled with about ½–4% gelatin having a bloom between about 100–300 and from about ½% to 3½% of a crumb carbohydrate thickener.

Applications where the instant comestibles might be considered for use because of their resistance to syneresis in refrigerated (as distinguished from frozen) storage and ability to collapse forming a fluent palatable sauce at consumption temperature include closed and open-faced sandwiches such as sloppy joe, barbecue beef, and meatball, creamed dishes such as creamed tuna, chicken a' la king, creamed beef over toast, Newburgs such as lobster and shrimp, chop suey, gravies, e.g., mushroom and brown, spaghetti, goulash, and pie toppings such as pizza pie.

Virtually any meat can be used in the sandwich filler. It can be comminuted like hamburger or finer or in particulate pieces, usually in cubes or the like, ½" is usually the largest dimension, but often can be larger, such as roast beef slices. The meat constitutes preponderantly and usually substantially all of the discontinuous phase in the dispersion. Meat most popular for making the sauce is usually of a particle size similar to that of hamburger, even though other particulate forms can be used. The term meat known and includes beef, pork, lamb, fowl, e.g., turkey, chicken and duck, fish, e.g., tuna, salmon, whitefish, shrimp, meat products and derivatives such as sausage, including Italian, pepperoni, summer sausage, thuringer, bologna, salami, chicken loaf, and the like, can be used. The meats generally are cooked, braised or browned prior to forming the sauce. Some meats can be cooked in the presence of a sauce, although the general tendency in such instance is to suppress the browning of the meat.

A farinaceous substrate can be any solid substrate usually comprising shortening, emulsifier, flavorants and flour typified by such products as bread, Taco sheets, corn breads, biscuits, sandwich buns, crackers, rice, bulgur, noodles, e.g., spaghetti noodles, baked or unbaked doughs such as pizza dough, pie crust, pastry, and the like. In the vending of sandwiches, sandwich buns are preferred for reasons of custom, aesthetic appeal, and because they absorb a substantial proportion of sauce after heating in an oven, thus preventing most of the fluent sauce from dripping.

Virtually any seasonings or spice (including herbs, seeds, condiment mixtures, etc.) can be used for flavoring the comestible of sandwich fillers and toppings. They are added in any proportion for achieving desired culinary taste. Such seasonings or spices include salt, pepper, oregano, mustard, cinnamon, garlic powder, onion salt, rosemary seed, monosodium glutamate, red pepper, chili powder, curry powder, paprika, and the like.

The continuous phase of the edible comestible comprises from about ½–4%, preferably between 1.75–2.25%, gelatin having a bloom of 100–300 and from about ½% to 3½%, preferably between 1½–2½%, of a crumb carbohydrate thickener, both by weight of the product. The combination of the gelatin and crumb carbohydrate thickener provides for the continuous phase to be in rigid form (self supporting) during refrigerated storage. With preferred levels of gelatin and crumb thickener, the continuous phase remains in rigid form at a temperature of up to about 60° F. With non-preferred levels of same, the continuous phase remains in rigid form to a temperature up to about 40° F. and at this temperature, beings to structurally collapse at the surface often forming a semi-solid, but not so completely as to form a fluent sauce.

The bread crumbs and gelatin also act to bind the water in the continuous phase of the comestible to prevent loss of water into the farinaceous substrate at refrigerated temperatures. Without such combination, the comestible on thawing has a tendency to partially collapse with the surface showing substantial signs of syneresis. On heating to a temperature of 80° F. and above, the continuous phase collapses from its rigid form to form a palatable fluent liquid phase sauce having a consistency of the popular "home-made" sauces.

By palatable liquid it is meant that the liquid or fluent sauce should have a desirable mouth feel and approach the fluidity of the popular "home-made" sauces for the corresponding product. The sauce for sloppy joe and barbecue beef sandwiches approaches a fluidity similar to canned tomato sauce or ketchup while a sauce for spaghetti, beef stroganoff, etc., is slightly less viscous. Brown and "au jus" gravies may be less viscous than the spaghetti sauces. For efficiency it is preferred that the viscosity of the continuous phase be sufficient to prevent the sauce from readily dripping from the farinaceous substrate when eaten. The viscosity of the sauces varies with the type of product that is produced and the technique is to regulate the fluidity of the sauce to approach the popular home-made versions. The fluidity of the continuous phase at consumption temperature can be regulated by increasing the bread crumb content, decreasing the water used in making up the continuous phase, or by increasing the solid content.

Crumb carbohydrate thickeners are those thickeners having a large proportion of carbohydrate therein and having moisture-absorbing properties. The crumb carbohydrate thickeners aid in preventing syneresis of the continuous phase when the comestible is maintained at refrigerated temperatures. It is imperative that the continuous phase possess a dry appearance and not readily weep into the sandwich bun, otherwise the substrate is usually unsightly, soggy, and often unmarketable because of resulting discoloration of the bun. Crumbs generally have a particle size of from about 177–1200 microns. Larger crumb particles often detract from the taste of the sauce by overpowering the meat and other flavorants therein. Crumbs having a particle size of less than 177 microns are not preferred because they often are relatively inefficient for absorbing surface moisture of the continuous phase, preventing syneresis. Crumbs larger than 1200 microns are effective for moisture absorption, but these larger particles are more noticeable to the taste and, therefore, are not preferred. The crumb carbohydrate thickeners include bread crumbs, cracker crumbs, Graham cracker crumbs, corn bread crumbs, etc. Virtually any type of bread can be used for forming the bread crumb thickeners. The bread usually includes being prepared by baking a kneaded, yeast-leavened dough, such as enriched bread, whole wheat bread, Graham bread, rye bread, etc., or buns, rolls, and other pastry items.

Gelatin having a bloom of 100–300, and preferably from 175–225, is added to the sandwich filler for purposes of causing the continuous phase to gel into a rigid-form, self-supporting body. On heating the comestible to a temperature of about 80° F. and usually between 110–150° F., the gelatin collapses, the gelatin being thermally reversible with the continuous phase forming a palatable fluent liquid. The bloom of the gelatin is an important variable in functionality, i.e., gelation and ultimate collapsing of the continuous phase of the comestible. Bloom, as is known, is a characteristic uniformly used to identify the gelation property of gelatin, the higher the bloom rating the higher the temperature at which the gelatin will form a solid. When the bloom rating falls below about 100, the gelatin content usually must be substantially increased for it to gel and obtain a rigid-form product at a temperature of 40° F. Bloom ratings of about 300 and above produce a product which remains in rigid form at 60° F. and does not produce the desired fluidity of the sauce at the normal temperature of consumption. In addition, the product often has a somewhat gummy appearance and taste. It has been found that bloom ratings of between about 175–225 are preferred in making the continuous phase of the comestible.

With the above bloom ratings, the proportion of gelatin in the continuous phase is between about from ½–4% by weight. A gelatin content of above 4% by weight usually results in the sauce having a gelatinous like taste which is undesirable. Preferable gelatin contents are between about 1.75–2.25%.

Conventional thickeners can be added to the continuous phase to aid in preventing syneresis and for maintaining the continuous phase in rigid form. They include cellulosic gums, for example, carboxymethyl cellulose, and hydroxyethyl cellulose. Other thickeners are sodium cellulose sulfates, waxy rice flours, propylene glycol alginate, calcium carrageenan, and the like.

During refrigerated storage, there is often a tendency for micro-organisms and mold to grow on the comestibles, fillers and toppings. Shelf-like during this period can be extended by incorporating conventional anti-oxidants and preservatives in the comestibles. These preservatives and anti-oxidants include sorbic acid, potassium sorbate, BHA (butylated hydroxy anisole) and BHT (butylated hydroxy toluene). These anti-oxidants and preservatives are added in amounts necessary to achieve desired results and such amounts are well known to those skilled in the art.

It has been found that conventional thickeners such as those set forth cannot be substituted to the exclusion of the crumb carbohydrate thickeners or gelatain in practicing the invention. In each case where such substitution has been made, the product either does not possess resistance to syneresis at refrigerated temperatures or does not permit the rigid-form of the continuous phase to collapse when heated to a temperature of about 110° F. If crumb carbohydrate thickeners are used to the exclusion of gelatin, the product normally has resistance to syneresis but does not possess the functionality of collapsing at higher temperatures to form a palatable fluent liquid sauce. Also, gelatin alone does not provide resistance to syneresis even though it imparts functionality to the continuous phase.

Conventional emulsifiers can also be used in forming the comestible of sandwich filler or topping to prevent grease or oil from separating from the water phase. These emulsifiers include lecithin, polyoxyalkylene ethers of fatty esters of polyhydric alcohols such as the polyoxyethylene ether of sorbitan monostearate, fatty esters of polyhydric alcohols such as sorbitan monostearate and mannitan monostearate, and also propylene glycol monostearate, propylene glycol monopalmitate, mono and diglycerides and glycerol lactopalmitate or glycerol lactostearate, and the like.

In forming the continuous phase, the ratio of water to solid content normally is maintained between about 1.5 to 1 and 3.5 to 1. The water content can be varied for achieving desired results with the given sauce. Generally where the ratio of water to solids exceeds 3.5 to 1, the sauce has a tendency to exhibit syneresis during refrigerated storage and to drip off from the comestible when it is eaten. Where too little water has been used, the filler is somewhat dry and pasty in appearance. In other words, a palatable liquid is not formed on heating. Such water adjustment for achieving proper and desired results are within the competence of those skilled in the art.

The following examples are provided to illustrate preferred embodiments of this invention but are not intended to limit the scope thereof. All parts are parts by weight, all weights are weight percentages, and all degrees are degrees Fahrenheit, unless otherwise specified.

EXAMPLE 1

A "sloppy joe" sandwich filling is made from the following ingredients:

| | Parts |
|---|---|
| Ground meat (hamburger) | 35 |
| Water | 27 |
| Tomato sauce | 18 |
| Spice mix of salt, pepper, chili powder, sugar, onion, starch, garlic, dextrin | 7.2 |
| White bread crumbs (particle size 80% between 177 microns to 420 microns) | 2 |
| Gelatin (bloom—200) | 1.5 |
| Potassium sorbate | 0.1 |
| Tenox (20% BHA–20% BHT, corn oil carrier) | 0.025 |
| | 100.00 |

The sandwich filler is prepared by first brownnig the hamburger at a temperature of 350° F. on a grill. The spice mix and water are mixed in a Hobart mixer until all of the lumps, if present, are dispersed. The tomato sauce, bread crumbs, potassium sorbate and Tenox are mixed in a separate container until homogeneously dispersed. Then the browned hamburger, dispersed spice mixture and dispersed tomato product are combined in a kettle having an agitator and heated to a temperature of 190° F. The heat is turned off, allowing the contents to cool while agitation is continued. The gelatin then is added to the heated mixture and agitated therein for homogeneous dispersion. When the temperature has dropped to a temperature of around 70–90° F., the content from the kettle are poured into polyethylene casings approximately one foot long and about 2½″ in diameter. These filled casings are then frozen. The frozen encased bodies are sawed into approximately ⅜″ thick sections for obtaining desirable serving portions of approximately 2 ounces.

A sandwich containing the filler set forth above is prepared for consumption by placing the frozen ⅜″ sections into a bun. In normal vending of sandwiches, the filler will defrost and thaw to a temperature of from 36–40° F. in the machine. On defrosting for a period of 4 hours, the filler remains in rigid form having a dry-to-the-touch surface and imparting no discoloration or sogginess to the sandwich bun. The sandwich on purchase is removed and heated in a microwave oven to a temperature of 110–130° F. The sandwich filler collapses to form a palatable liquid having a viscosity corresponding to its home-made counterpart.

The sandwich after heating is rated on the 9-point Hedonic scale which is a test method for rating foods. The test is described in the "Manual of Sensory Testing Methods" published by the American Society of Testing Methods, vol. STP–434, 1968. The scale is a 9-point scale comparing the degrees of dislikes and likes of the panel judging the given product. The degrees of dislikes and likes each has an assigned number, e.g., "dislike extremely" has a value of 1 at the bottom, and the "like extremely" has a value of 9 at the top. Generally where the product has a rating of from 5–5½, the product is acceptable for further commercial evaluation. The sloppy joe sandwich filler above is given an appearance rating of 6.77, a flavor rating of 5.81, a texture of 6.11 and an overall preference of 6.04, thus showing its acceptability as a sandwich filler.

EXAMPLE 2

A barbecue beef sandwich filler is prepared with the following ingredients:

| | Parts |
|---|---|
| Chris & Pitts BBQ Sauce (a trademark owned by the SCM Corporation) | 60.4 |
| Chopped beef | 35.0 |
| White bread crumbs (80% between 177 microns to 420 microns) | 2.62 |
| Gelatin (bloom—200) | 0.98 |
| Salt | 0.65 |
| Adipic acid | 0.28 |
| Potassium sorbate | 0.07 |

The ingredients are mixed and the sandwich filler is prepared in the same manner as set forth in Example 1, that is the chopped beef is roasted in an oven to a medium cook. The barbecue sauce, bread crumbs, potassium sorbate and adipic acid are mixed and heated to 190° F. The gelatin is added slowly while maintaining agitation thereof. The chopped meat is added to the sauce and the mixture is allowed to cool to a temperature of 70–90° F. Then the product is cast into desired serving portions and frozen. On thawing to 40° F., the product exhibits no syneresis and remains in rigid form. A barbecue beef sandwich of excellent quality, having a sauce consistency of a home-made barbecue beef sauce, is obtained. Furthermore, the taste of the barbecue beef sandwich is excellent and without adverse gelatin flavor.

EXAMPLE 3

A sandwich filler similar to Example 2 is prepared except that a gelatin having a bloom of 75 is used instead of the gelatin of bloom 200. It is found that the sandwich filler, on thawing, did not remain in sufficient rigid form to prevent flowing from the bun. In addition, it did not prevent weeping of the blend of water and tomtato sauce into the bun. Although a substantially rigid filler is obtained at a gelatin level of about 5%, the sandwich filler exhibits a pasty gelatinous taste.

EXAMPLE 4

Several sloppy joe sandwich fillers having the composition of Example 1 are prepared by substituting the thickening ingredient as set forth in column 1 for the bread crumbs and gelatin. Substitution of the thickener for the bread crumbs and gelatin is done for purposes of determining if the gelatin and crumb carbohydrate thickener could be eliminated for control of syneresis and for maintaining functionality.

| Column 1 (Ingredient) | Column 2 (Results) |
|---|---|
| Filler I: 1.0 part propylene glycol alginate. | Sandwich filler has a gummy texture and somewhat pasty appearance after heating in a microwave oven. |
| Filler II: 0.5 part citrus pectin having 62–66% esterification. | Sandwich filler exhibits some weeping of water and tomato sauce and the product does not collapse to form a palatable liquid on heating in a microwave oven. |
| Filler III: 0.5 part low methoxyl pectin. | Sandwich filler exhibits weeping and is not functional in that the product does not collapse on heating in a microwave oven and product exhibits gummy appearance and texture. |
| Filler IV: 0.5 part of a high viscosity propylene glycol alginate. | Product exhibits substantial weeping and is not functional in that it does not collapse on heating and has a gummy appearance and texture. |
| Filler V: 1.0 part sweet rice flour. | Sandwich filler exhibits a gummy texture on heating in a microwave oven. |

EXAMPLE 5

A sloppy joe sandwich filling having the composition of the filling set forth in Example 1, except that the bread crumbs are excluded, is prepared. The filler, after being prepared in accordance with the manner of Example 1, is frozen, cast into serving portions and allowed to thaw to a temperature of 40° F. The sandwich bun becomes discolored and slightly soggy after the frozen filler is exposed for a period of about 5 hours at 40° F.

A second sloppy joe sandwich filler having the composition of Example 1, except that the gelatin is removed therefrom, the bread crumbs being present, is prepared. The sandwich filler is prepared in accordance with the method of Example 1. After preparation, the filler is cast into serving portions, frozen and allowed to thaw to a temperature of 40° F. The filler does not retain its rigid form and becomes sufficiently fluent to flow from the sandwich bun.

What is claimed is:

1. In an edible comestible adapted for refrigerated storage comprising a continuous aqueous sauce phase and a discontinuous meat phase, the improvement for rigid form syneresis resisting refrigerated storage which comprises in said continuous phase from ½ to 4% by weight of said comestible gelatin having a bloom between about 100 and 300 and from about 1½% to 3½% by weight of said comestible of a crumb carbohydrate thickener, the continuous phase having the property of maintaining rigid form at a temperature of not substantially in excess of 60° F. and the property of structurally collapsing for forming a palatable liquid at a temperature of not substantially less than 80° F.

2. The comestible of claim 1 wherein said thickener is bread crumbs.

3. The comestible of claim 2 wherein said gelatin has a bloom between about 175–225 and is present in a proportion of about 1.75–2.25%, and said bread crumbs are present in a proportion of from about 1½% to 2½%.

4. The comestible of claim 2 having flavoring adjuvants.

5. A process for making and storing comestibles for vending machine operation which comprises: placing the comestible of claim 1 in frozen condition in contact with an edible farinaceous substrate, then thawing said assembly to a refrigerated temperature of from 34° to 45° F., maintaining the resulting assembly at a temperature sufficiently low to keep said comestible in rigid condition whereby on heating said comestible to a temperature of not substantially less than 80° F., said continuous phase collapses forming a palatable liquid.

6. A process for forming a sandwich having a filler and sandwich bun, said filler being substantially resistant to syneresis while remaining in rigid form when maintained at a temperature of not substantially higher than about 400 F. which comprises: (a) blending comminuted meat, water, from about ½–4% gelatin having a bloom between about 100–300, from about ½% to 3½% bread crumbs, both gelatin and bread crumbs being by weight of said filler, and flavorants to form a substantially homogeneous filler, (b) casting the homogeneous filler into desired serving portions, (c) freezing said filler for indefinite storage, (d) inserting said frozen filler into said sandwich bun, (e) defrosting the frozen filler to a temperature not substantially in excess of 45° F., and (f) heating said sandwich bun and filler to a temperature of at least about 100° F.' prior to consumption.

7. The process of claim 6 wherein said heating is done in a microwave oven.

References Cited
UNITED STATES PATENTS

| | | | |
|---|---|---|---|
| 3,083,108 | 3/1963 | Kline et al. | 99—208 |
| 3,100,710 | 8/1963 | Carlin | 99—107 |
| 3,353,968 | 11/1967 | Krajewski | 99—192 |
| 3,338,155 | 8/1967 | Lindblad et al. | 99—171 H |
| 2,834,677 | 5/1958 | Geisler | 99—1 |

OTHER REFERENCES

Frandsen et al.: "Ice Cream and Related Products," The Avi Publishing Co., Inc., West Fort, Conn., 1961, TX795F7, pp. 62–63, 452–459.

Sommer: "Theory and Practice of Ice Cream Making," 6th edition, Olsen Publishing Co., Milwaukee, Wis., 1951, TX795S6, pp. 62—63, 452–459.

RAYMOND N. JONES, Primary Examiner

U.S. Cl. X.R.

99—108, 86